US011144264B2

United States Patent
Ruan et al.

(10) Patent No.: US 11,144,264 B2
(45) Date of Patent: Oct. 12, 2021

(54) NON-TRANSITORY COMPUTER-READABLE RECORDING MEDIUM STORING INSTRUCTIONS FOR RECEIVING AN EDIT INSTRUCTION AND A PRINT INSTRUCTION FOR A TEMPLATE IMAGE

(71) Applicant: BROTHER KOGYO KABUSHIKI KAISHA, Nagoya (JP)

(72) Inventors: Longlong Ruan, Nagoya (JP); Machiko Watanabe, Nagoya (JP); Masanori Oda, Iwakura (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 16/995,733

(22) Filed: Aug. 17, 2020

(65) Prior Publication Data

US 2021/0055900 A1 Feb. 25, 2021

(30) Foreign Application Priority Data

Aug. 19, 2019 (JP) .............................. JP2019-149845

(51) Int. Cl.
*G06F 3/12* (2006.01)
*H04N 1/00* (2006.01)

(52) U.S. Cl.
CPC .......... *G06F 3/1257* (2013.01); *G06F 3/1296* (2013.01); *H04N 1/00411* (2013.01)

(58) Field of Classification Search
None
See application file for complete search history.

(56) References Cited

U.S. PATENT DOCUMENTS

| | | | | |
|---|---|---|---|---|
| 5,970,183 A | * | 10/1999 | Amemiya | G06T 7/12 382/282 |
| 7,013,428 B1 | * | 3/2006 | Kamen | G06F 21/84 715/231 |
| 8,566,704 B1 | * | 10/2013 | Le Bescond de Coatpont | G01N 31/22 715/234 |
| 2014/0247464 A1 | * | 9/2014 | Sugimoto | G06K 15/1889 358/1.15 |
| 2021/0035069 A1 | * | 2/2021 | Parikh | G06Q 10/06313 |

FOREIGN PATENT DOCUMENTS

| | | |
|---|---|---|
| JP | 2007-334649 A | 12/2007 |
| JP | 2012-78886 A | 4/2012 |

* cited by examiner

*Primary Examiner* — Fan Zhang
(74) *Attorney, Agent, or Firm* — Kenealy Vaidya LLP

(57) ABSTRACT

A device selects a template image, and displays a first screen on a display of the device. The first screen includes the selected template image and a first object used for receiving print instruction. In a case where the selected template image is a first type of template image and has not been edited, the device makes the first object disabled. In a case where the selected template image is the first type of template image and the template image has been edited, the device makes the first object in the first screen enabled, and outputs a print job.

14 Claims, 10 Drawing Sheets

US 11,144,264 B2

NON-TRANSITORY COMPUTER-READABLE RECORDING MEDIUM STORING INSTRUCTIONS FOR RECEIVING AN EDIT INSTRUCTION AND A PRINT INSTRUCTION FOR A TEMPLATE IMAGE

CROSS-REFERENCE TO RELATED APPLICATION

This application claims priority from Japanese Patent Application No. 2019-149845 filed on Aug. 19, 2019, the content of which is incorporated herein by reference in its entirety.

TECHNICAL FIELD

In the present specification, the disclosure provides a program for receiving an edit instruction and a print instruction for a template image.

BACKGROUND

A program used for editing and causing printing a template image is known. The program displays the template image including a defined format at a display device, and receives an edit instruction for the template image. The displayed template image may be changed based on the label condition (e.g., label length) which is set by a user. After the template image is edited, the program receives a print setting for a print medium (e.g., label sheet) and a print instruction for the template image. Then, the program causes a printer (e.g., label printer) to print the edited template image on a print medium (e.g., label sheet) in accordance with the print setting.

SUMMARY

Such a template image may include default information for notifying a method of use to a user. The default information may include first type of information and second type of information. Although each type of the information is capable of being printed, each type of the information is different from each other as follows. The first type of information is information which is not available for a purpose which a user would desire without editing. An example of the first type of information is a "dummy two-dimensional code", which includes encoded "dummy" contents and therefore is not available by the user. The second type of information is information which is available for a purpose which the user would desire without editing. An example of the second type of information is a "common name", which is available if the user would desire to use as it is. If the user instructs to print the template image including the first type of information, the user may waste the printed sheets. Therefore, an operability for use of the template image is susceptible to improvement.

In the present specification, the disclosure provides a technique for improvement of operability when editing and printing the template image.

The present disclosure discloses a non-transitory computer-readable recording medium storing instructions. The instructions, when executed by a controller of a device having a function for displaying a template image, cause the device to perform: selecting a template image, the template image being one of a plurality of types of template images including a first type of template image required to be edited and a second type of template image different from the first type of template image; displaying a first screen on a display of the device, the first screen including the selected template image and a first object, the first object being used for receiving a print instruction; making the first object in the first screen disabled in a case where the selected template image is the first type of template image and has not been edited, wherein the first object is not made disabled in a case where the selected template image is the second type of template image; receiving an edit instruction for editing the selected template image; making the first object in the first screen enabled in a case where the selected template image is the first type of template image and has been edited; and outputting a print job for printing the selected template image in a case where the first object in the first screen is operated via an input interface of the device.

By executing the program disclosed in the present specification, the device displays the first screen including the selected template image and the first object for receiving print instruction. Then, the device displays the first screen including the first object being disabled in a case where the type of selected template image is a type which requires to be edited and where the selected template image is not edited. Thus, a print instruction for the template image which requires to be edited is not received before the template image is edited. Therefore, waste of the printed sheets may be avoided.

An information processing device and a control method for implementing the above-described program, and computer-readable storage media storing the program may have novelty and utility.

DETAILED DESCRIPTION

Hereinafter, a first embodiment relating to a program implemented in the device will be described in detail with reference to the drawings. This embodiment provides an application program (hereinafter referred to as the "application") implemented in a device. The device is portable and is capable of displaying an image (e.g., smartphone).

Figure 1:
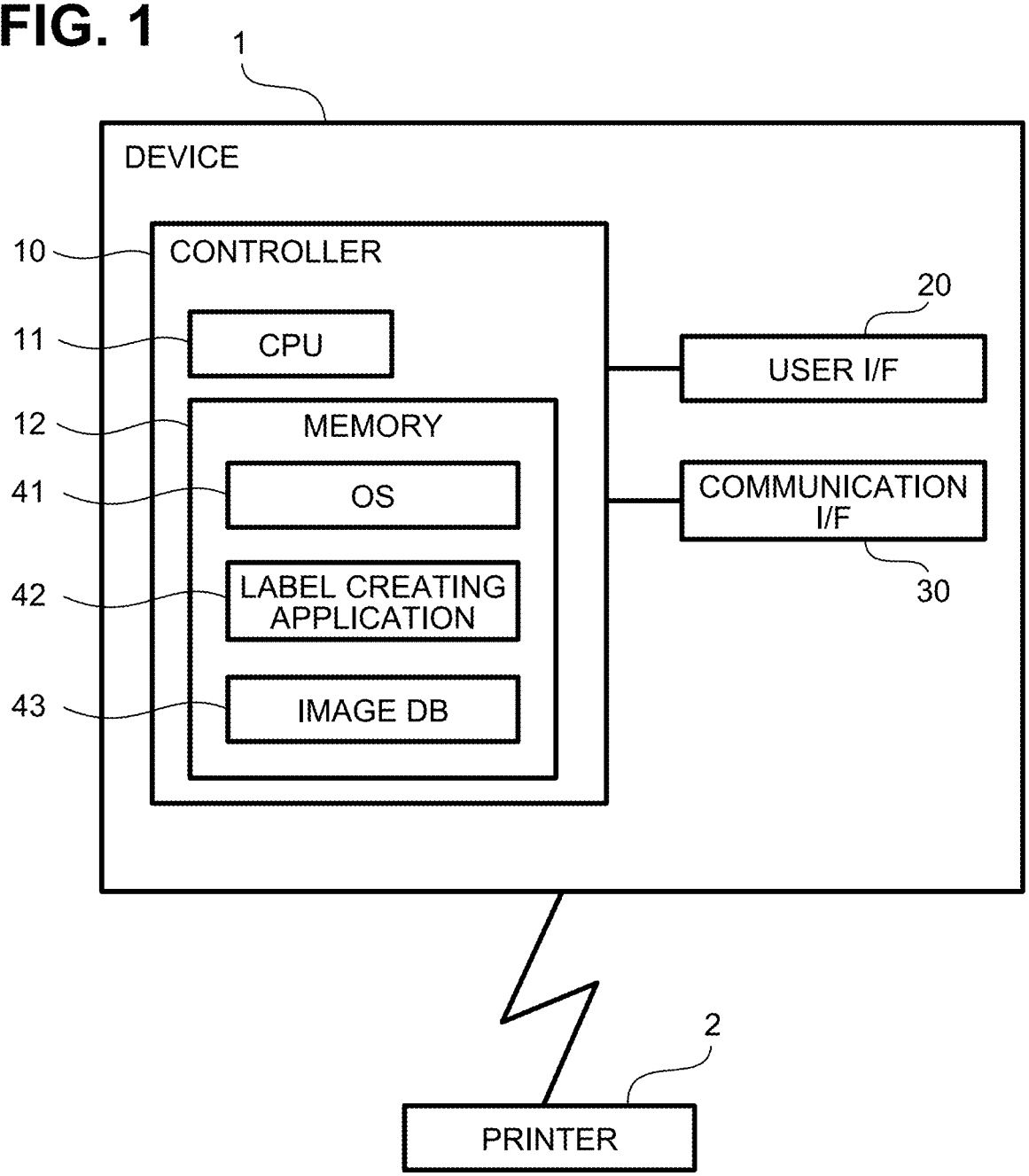
FIG. 1 is a schematic diagram of a device according to an illustrative embodiment of the disclosure.

As illustrated in FIG. 1, a device 1 includes a controller 10. The controller 10 includes a CPU 11 and a memory 12. The device 1 is configured to connect to a printer 2. The device 1 further includes a user interface 20 (hereinafter referred to as "user I/F") and a communication interface 30 (hereinafter referred to as "communication I/F"). The user I/F 20 and the communication I/F 30 are configured to be connected to the controller 10 electrically. The device 1, for example, is a device capable of executing an application for causing the printer 2 to print. The controller 10 described in FIG. 1 is a generic term for each hardware and software which controls the device 1, and is not limited to a single hardware included in the device 1.

The CPU 11 executes various processing in accordance with a program stored in the memory 12 or user's operation. The CPU 11 is an example of a "computer". The memory 12 includes at least one of a volatile memory or a nonvolatile memory (e.g., ROM, RAM, HDD or flash memory) and stores various programs and data.

The user I/F 20 includes a touchscreen function including a displaying function and a receiving function. The user I/F 20 is an example of a "display" and an "input interface". Nevertheless, the user I/F 20 may include a combination of a displaying device capable of displaying information (e.g., a display) and a receiving device capable of receiving input operation from a user (e.g., a keyboard or a mouse).

The communication I/F 30 includes a hardware capable of communicating with an external device (e.g., the printer 2). Communication mode of the communication I/F 30 may be either of wireless LAN or wired LAN. The communication mode may be any communication standard (e.g., Wi-Fi (Registered Trademark, Wi-Fi Alliance), Bluetooth (Registered Trademark, BLUETOOTH SIG, INC.) or USB). Nevertheless, the device 1 in this embodiment may have a function to connect to the Internet via the communication I/F 30.

As illustrated in FIG. 1, the memory 12 in the device 1 in this embodiment stores an operating system 41 (hereinafter referred as "OS"), a label creating application 42 and an image database 43 (hereinafter referred as "image DB"). For example, the OS 41 may be iOS (Registered Trademark, CISCO SYSTEMS, INC.), Android (Registered Trademark, GOOGLE LLC), Windows (Registered Trademark, MICROSOFT CORPORATION), MacOS (Registered Trademark, Apple Inc.) or Linux (Registered Trademark, TORVALDS, LINUS).

The printer 2 in this embodiment may be a label printer that includes a print head of thermal transfer type. The printer 2 is configured to accommodate a label sheet in a roll form and perform printing while unwinding the label sheet. For example, the printer 2 prints an image on the accommodated label sheet based on the print job received from the device 1, conveys the label sheet, and ejects the printed area of the label sheet outside of the device 1.

The print head of thermal transfer type gradually accumulates heat by successive printing, and the temperature of the print head may rise. Because excessive temperature rise of the print head leads to a trouble, the printer 2 is configured to stop operation in a case where the temperature of the print head exceeds a predetermined temperature. In this embodiment, a maximum sheet length which is a length of the label sheet available in a single successive printing is set for each printer model for preventing the printer 2 from stopping operation due to the excessive temperature rise. The printer 2 stops the operation in a case where the length of the printed sheet in successive printing exceeds the maximum sheet length.

The label creating application 42 in this embodiment is an application for creating a variety of labels by using the printer 2. The label creating application 42 is an example of a "program". The label creating application 42 receives an instruction for creating and editing an image to be printed at the printer 2, and displays the image on the user I/F 20. The label creating application 42 receives an instruction for executing printing of the image being displayed, creates a print job based on the image being displayed, and transmits the print job to the printer 2. Nevertheless, the label creating application 42 in this embodiment may be a program independently executable based on a user's operation, or a program executable by being called from another program while the other program is being executed.

The image DB 43 is a memory area storing a variety of image data used by the label creating application 42. The label creating application 42 displays an image represented by image data stored in the image DB 43 on the user I/F 20 based on the user's instruction. In this embodiment, for example, a plurality of template image data selectable at the label creating application 42 and a plurality of image data each of which represents an example image are stored in the image DB 43. The example images indicate an example of use of the respective template images. Each example image is associated with at least one of the template images. Nevertheless, the image data stored in the image DB 43 may be stored from the beginning when the image DB 43 is stored in the memory 12, or may be received from an external device (e.g., a server) as needed.

The template image used in the label creating application 42 is a prototype image for creating a label, and includes a sample image (e.g., character string, code image, flame image or illustration). The label creating application 42 is, for example, an application for receiving a creating instruction and a print instruction for the template image stored in association with the example image. By selecting an example image being associated with the template image similar to a desired label, and by inputting the edit instruction and the print instruction for the selected template image using the label creating application 42, the user may obtain the desired label easily.

Hereinafter, referring to the flowchart of FIG. 2, the label creating process by the label creating application 42 of this embodiment will be described. The label creating process is executed by the CPU 11 of the device 1 in response to receiving an execution instruction of the label creating application 42. Basically, the following processes and each step in the flowchart indicate processes by the CPU 11 in accordance with instructions in each program. The processes by the CPU 11 may include a hardware control using an API of the OS 41 in the device 1. In the present specification, the performance of each program will be described by omitting the description of the OS 41.

Figure 3:
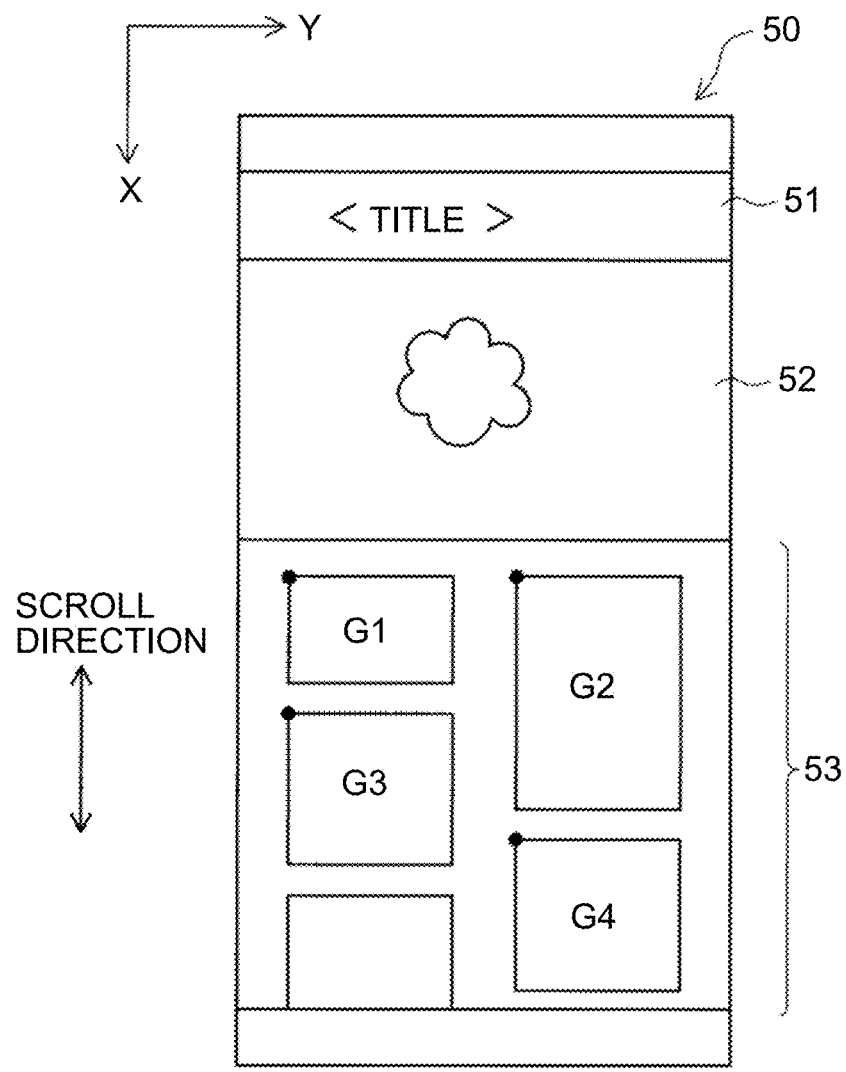
FIG. 3 is an illustrative figure indicating an example of a top screen.

In S101 of the label creating process, the CPU 11 displays a top screen 50 on the user I/F 20. The top screen 50 in this embodiment includes, for example, a title 51, a top image 52 and an image area 53 for displaying a plurality of example images as described in FIG. 3. The plurality of example images include an example image G1 and an example image G2. Each of the title 51 and the top image 52 is an image indicating the label creating application 42. The user may select the template image by designating each of the plurality of example images. The top screen 50 includes one or more selectable example images. The one or more selectable example images are sequentially displayed by scrolling the top screen 50.

In S102, the CPU 11 determines whether a selection instruction for selecting the example image among the one or more example images being displayed at the top screen 50 is received. The CPU 11 receives the selection instruction for the example image by a user's tapping to the example image. In the label creating application 42 in this embodiment, the template image associated with corresponding example image is selected by the selection instruction of the corresponding example image, and the CPU 11 proceeds to displaying a template screen for displaying the selected template image.

In S103, in a case where it is determined that the selection instruction of the example image (NO in S102), CPU 11 determines whether a terminative instruction of the label creating application 42 is received. In a case where it is determined that the terminative instruction is not received (NO in S103), the CPU 11 waits until the CPU 11 receives either of the selection instruction of the example image or the terminative instruction of the application. In a case where it is determined that the terminative instruction is received (YES in S103), the CPU 11 terminates the label creating process.

On the other hand, in S104, in a case where it is determined that the selection instruction is received (YES in S102), the CPU 11 obtains attribute information of the template image associated with the selected example image. The attribute information of the template image includes information related to necessity of editing before printing of the template image.

The template images disclosed in this embodiment may include a template image capable of being used for printing without being edited and a template image required to be used after the template image is edited. In this embodiment, the template images are categorized into four types as indicated in FIG. 4A to 4D. The attribute information indicating which of the four types the template image belongs to is associated with each template image data.

Figure 4A:
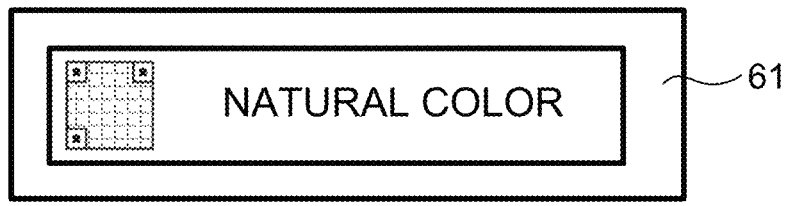
FIGS. 4A, 4B, 4C, and 4D are illustrative figures each indicating an example of a template image.

The example described in FIG. 4A is a template image 61 including, for example, a code image (e.g., two-dimensional code, barcode). The template image 61 is required to be edited for modifying the code image before printing because the encoded contents may be "dummy", and is not available for the purpose which the user would desire without editing. Hereinafter, the template image such as the template image 61 which is required to be edited is referred to as an "edit required image". The edit required image includes, for example, a dummy code image or a dummy personal information (e.g., address, birthday, telephone number, or authentication information). The edit required image is an example of a "first type of template image".

Figure 4B:
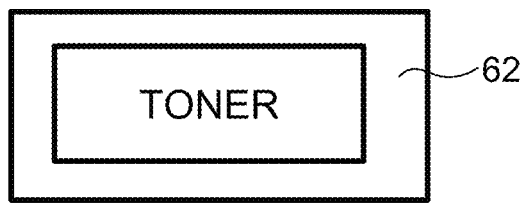

The example described in FIG. 4B is a template image 62 including, for example, a designation of general type of goods or a fixed phrase of greeting using a general typeface (e.g., Mincho typeface, Gothic typeface). The template image 62 is available for the purpose which the user would desire without being edited. The template image 62 may also be edited before printing (e.g., adding or changing character string). Hereinafter, the template image such as the template image 62 which may not be necessarily required to be edited and may be edited is referred to as an "editable image". The editable image is an example of a "second type of template image".

Figure 4C:
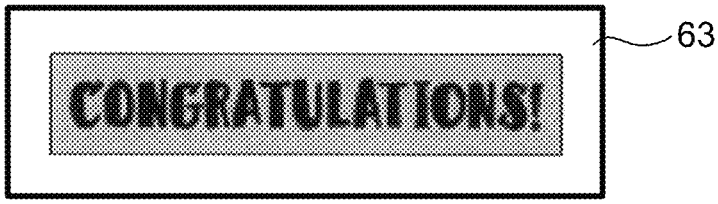

The example described in FIG. 4C is a template image 63 including, for example, an original illustration or an original typeface provided by a vendor of the label creating application 42. The template image 63 is not allowed to be edited. Hereinafter, the template image such as the template image 63 which is not allowed to be edited is referred to as a "non-editable image". The non-editable image is an example of a "third type of template image".

Figure 4D:
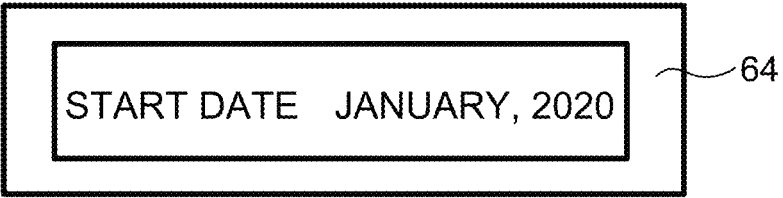

The example described in FIG. 4D is a template image 64 including, for example, an example of a date or a day of the week. Basically, the template image 64 is to be printed after being edited. The template image 64 of FIG. 4D is capable of being used without editing, which is different from the feature of the template image 61 of FIG. 4A. The user may instruct printing for the template image 64 without editing if the information in the template image 64 is suitable for the user. In the label creating application 42, in a case where print instruction for the template image such as the template image 64 which is capable of being used without editing but is preferable to being edited is received, a confirmation dialog for confirming whether printing of the template image without editing is permitted is displayed. Hereinafter, the template image such as the template image 64 is referred to as a "print confirmation image". The print confirmation image is an example of a "specific type of template image" in the "second type of template image".

In S105, the CPU 11 determines whether the type of the selected template image is the edit required image based on the obtained attribute information. The determination of the type of the template image is not limited to the determination based on the attribute information. For example, in other embodiments, the CPU 11 may determine the type of the template image based on an object type of the template image. For example, the CPU 11 may determine that the type of the template image is the edit required image in a case where the template image includes a code object. The determination whether the template image includes the code object is, for example, by obtaining pixel values included in a specific line of the image and counting the number of areas in which successive pixels having the same color are included, which indicates a bar having predetermined width. The CPU 11 may determine that the type of the template image is the non-editable image in a case where the template image only includes an illustration object. The determination whether the template image only includes the illustration object is, for example, by specifying whether the proportion of an area having a chromatic color in the whole image area is equal to or more than a predetermined value. The CPU 11 may determine that the type of the template image is the editable image or the print confirmation image in a case where the type of the template image is not determined to be the edit required image nor the non-editable image.

In S106, in a case where it is determined that the type of the template image is the edit required image (YES in S105), the CPU 11 determines to make a print button be grayed out. The print button is a button displayed at a template screen and for receiving the print instruction. The print button is disabled while the print button is grayed out, and the print instruction is not received in response to user's operation. On the other hand, the print button is enabled while the print button is not grayed out, and the print instruction is received in response to user's operation.

In S107, in a case where it is determined that the type of the template image is not the edit required image (NO in S105), the CPU 11 determines whether the type of the template image is the non-editable image. In S108, in a case where it is determined that the type of the template image is the non-editable image (YES in S107), the CPU 11 determines to make an edit button be grayed out. The edit button is displayed at the template screen and for receiving the edit instruction.

Figure 6:
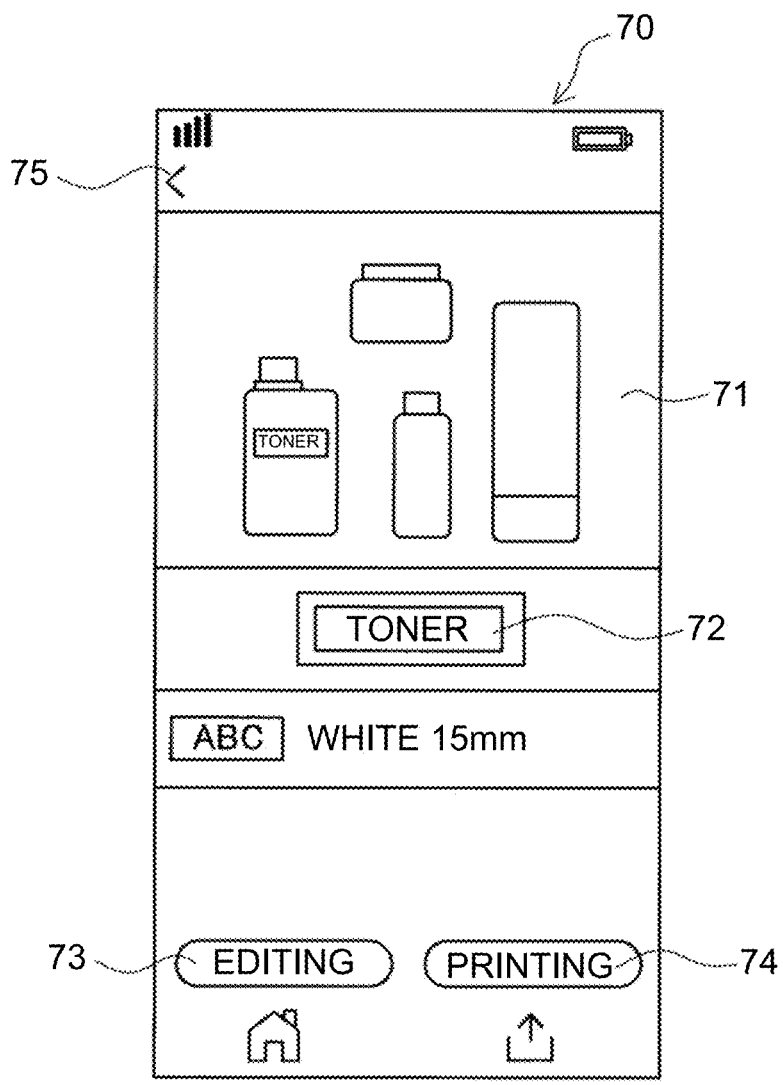
FIG. 6 is an illustrative figure indicating an example of a template screen.

In S109, after either of S106 or S108, or in a case where it is determined that the type of template image is not the non-editable image (NO in S107), the CPU 11 displays the template screen on the user I/F 20. As described in FIG. 6, the template screen 70 includes, for example, an example image 71, a template image 72, an edit button 73, a print button 74, and a back button 75. The template screen is an example of a "first screen".

The example image 71 is the same image as the example image selected at the top screen 50. The template image 72 is the image associated with the selected example image 71. The edit button 73 is for receiving the edit instruction for editing image data indicating the template image 72. The edit button 73 is an example of a "second object". The print button 74 is a button for receiving the print instruction for printing the template image 72. The print button 74 is an example of a "first object". The back button 75 is a button for receiving instruction for closing the template screen 70 and going back to the top screen 50.

As described at the steps of S106 or S108, the edit button 73 and the print button 74 may be determined to be grayed out. In S109, in a case where it is determined that the edit button 73 or the print button 74 to be grayed out, the CPU 11 displays the template screen 70 in which the edit button 73 is grayed out in a case where the type of the template image 72 is the non-editable image, and displays the template screen 70 in which the print button 74 is grayed out in a case where the type of the template image 72 is the edit required image.

If the print button 74 is enabled in a case where the template image whose type is the edit required image has been selected, the user may hit the print button 74 such that an unusable image may be printed on a sheet. In this embodiment, the print button 74 is disabled in a case where the edit required image is selected, whereby the unusable image may not be printed. In this embodiment, the edit button 73 may be disabled in a case where the non-editable image is selected in order to avoid an accidental access to the edit button 73 by the user. Nevertheless, the method for being disabled each object (e.g., button) is not limited to be grayed out. For example, a method in which the object is not displayed may be adopted. As another example, a method in which an input instruction from a user by using displayed object is received but the input instruction is canceled may be adopted.

In S110, the CPU 11 determines whether the edit instruction by using the template screen 70 is received. The CPU 11 receives the edit instruction by user's operation to the enabled edit button 73. In S111, in a case where it is determines that the edit instruction is not received (NO in S110), the CPU 11 determines whether the print instruction is received. The CPU 11 receives the print instruction by user's operation to the enabled print button 74. In S112, in a case where it is determined that the print instruction is not received (NO in S111), the CPU 11 determines whether the back instruction is received. The CPU 11 receives the back instruction by user's operation to the back button 75. In a case where it is determined that the back instruction is not received (NO in S112), the CPU 11 waits to proceed until either the edit instruction, the print instruction or the back instruction is received.

In S113, in a case where it is determined that the edit instruction is received (YES in S110), the CPU 11 executes an editing process. The editing process is a process for editing the selected template image 72.

Hereinafter, referring to the flowchart of FIG. 5, the editing process of this embodiment will be described. In S201, the CPU 11 determines whether the type of the selected template image 72 is the edit required image. The determination executed in S201 is the same as the determination executed in S105 of FIG. 2. The CPU 11 may execute determination in S201 based on the result of the determination in S105.

Figure 7:
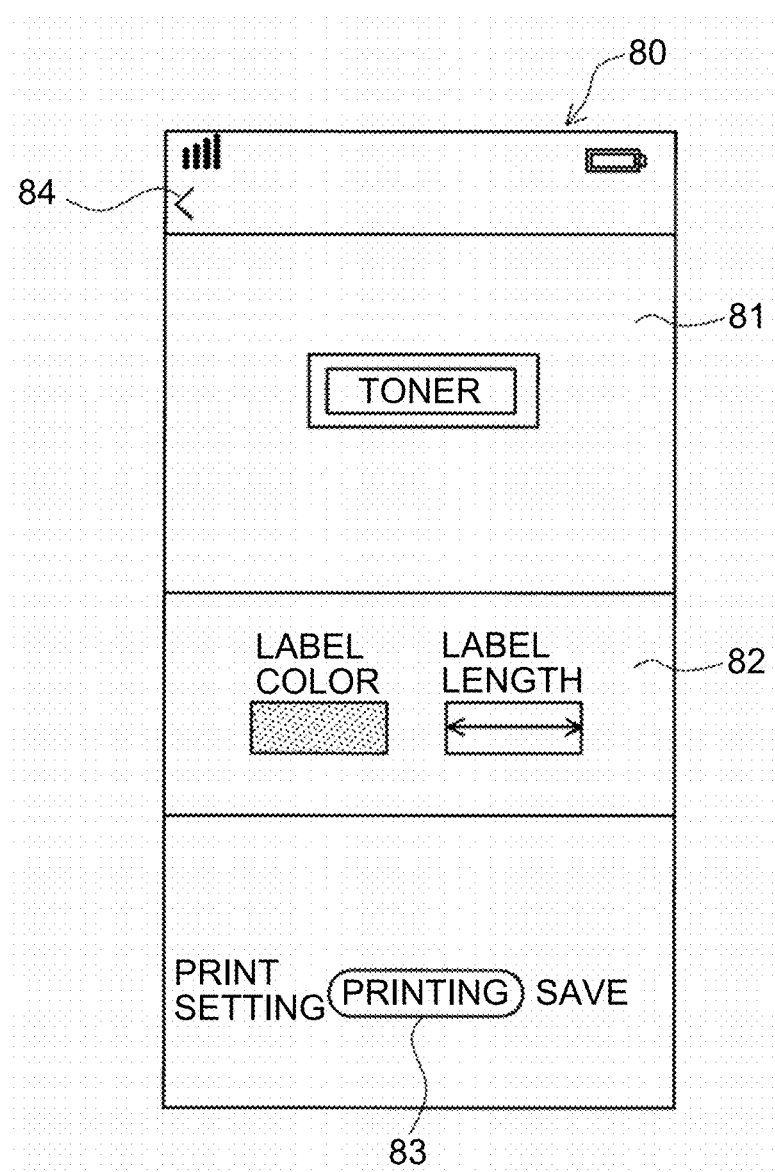
FIG. 7 is an illustrative figure indicating an example of an editing screen.

In S202, in a case where it is determined that the type of the template image is not the edit required image (NO in S201), the CPU 11 displays an editing screen 80 on the user I/F 20. As described in FIG. 7, the editing screen 80 includes, for example, an editing area 81, a print setting area 82, a print button 83 and a back button 84. The editing screen 80 is an example of a "second screen". The editing screen 80 may further includes a button for receiving instruction for changing print setting and a button for receiving instruction for storing edited image data.

The editing area 81 is an area for displaying an image represented by the edited image data. The CPU 11 displays the selected template image 72 at the editing area 81 in S202. At the print setting area 82, selected print setting (e.g., a label color, a label length) is displayed. The label length indicates a length in a longitudinal direction, of the printed label sheet, in which the label sheet is conveyed. The print button 83 is a button for receiving the print instruction for printing the image displayed at the editing area 81. The print button 83 is an example of a "third object". The back button 84 is a button for receiving instruction for closing the editing screen 80 and going back to the template screen 70.

In a case where it is determined that the type of the template image is the edit required image (YES in S201), the CPU 11 determines to make a print button 83 be grayed out in S203, and displays the editing screen 80 on the user I/F 20 in S204. The editing screen 80 including the disabled print button 83 is displayed in S204 in a case where the type of the template image 72 displayed in the editing area 81 is the edit required image. Therefore, the print instruction is not received while the editing screen 80 is displayed. Because the print button 83 is disabled while the template image is not edited, the label sheet may not be wasted.

On the other hand, the editing screen 80 including the enabled print button 83 is displayed in S202 in a case where the type of the template image 72 displayed in the editing area 81 is not the edit required image. Therefore, the print instruction is acceptable while the editing screen 80 is displayed regardless of whether the template image 72 has been edited. Because the enabled print button 83 is included in the editing screen 80 to receive the print instruction, the user's convenience may be enhanced.

In S205, after the editing screen 80 in which the print button 83 is disabled is displayed in S204, the CPU 11 determines whether an editing process for the editing area 81 is executed. For example, in S205, the CPU 11 determines that the editing process is executed in a case where a specific operation is received. For example, the specific operation may be a cursor movement to the editing area 81, a selection of the object in the editing area 81 which is required to be edited, an operation for deleting the object from the editing area 81, an operation for adding the object to the editing area 81.

In S207, in a case where it is determined that the editing process is executed (YES in S205), the CPU 11 changes the print button 83 from being disabled to being enabled, and displays the editing screen 80 including the enabled print button 83. That is, the template image whose type is the edit required image is changed to be capable of being printed after the template image has been edited. In S206, in a case where it is determined that the editing process is not executed (NO in S205), the CPU 11 determines whether the back instruction is received. The CPU 11 receives the back instruction by user's operation to the back button 84. In a case where it is determined that the back instruction is not received (NO in S206), the CPU 11 waits to proceed until either the edit instruction or the back instruction is received.

After either S202 or S207, in S208, the CPU 11 determines whether the print instruction is received by user's operation to the enabled print button 83. In S209, in a case where it is determined that the print instruction is not received (NO in S208), the CPU 11 determines whether the back instruction is received. In a case where it is determined that the back instruction is not received (NO in S209), the CPU 11 waits to proceed until either the print instruction or the back instruction is received. Until either the print instruction or the back instruction is received, the CPU 11 receives the edit instruction for the editing area 81, and updates the display of the editing area 81 based on the edit instruction.

In S210, in a case where it is determined that the print instruction is received (YES in S208), the CPU 11 determines whether the type of the template image 72 is the edit required image. In S211, in a case where it is determined that the type of the template image is the edit required image (YES in S210), the CPU 11 displays a confirmation dialog on the user I/F 20, and waits for receiving a user's input operation.

It is assumed that the template image whose type is the edit required image and that the template image includes a dummy code image. Even if the template image has been edited, the edited area in the template image may be an area other than the dummy code image. In this case, the dummy code image has not been edited. Considering such a case, in this embodiment, in a case where the type of the template image is the edit required image, the CPU 11 displays the confirmation dialog for confirming whether printing is permitted, and waits for receiving the user's input operation. According to the confirmation before printing, unnecessary printing may be avoided.

In S212, the CPU 11 determines whether the user's input operation for instructing printing is received at the confirmation dialog. In a case where it is determined that the type of the template image is not the edit required image (NO in S210) or that the user's input operation is received (YES in S212), in S213, the CPU 11 executes a printing process. The printing process is for causing the printer 2 to print the selected template image.

Figure 8:
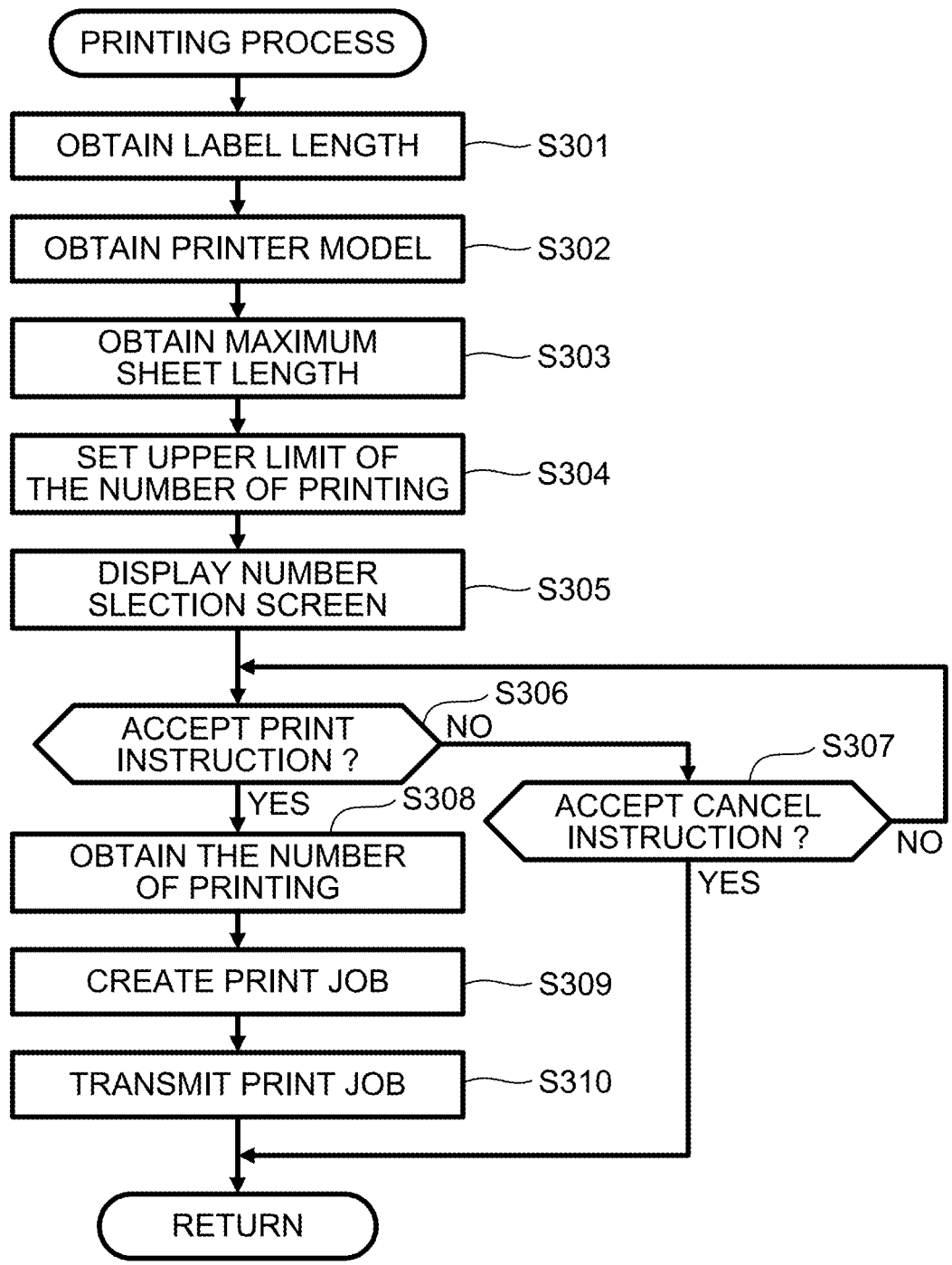
FIG. 8 is a flowchart of a printing process.

Hereinafter, referring to the flowchart of FIG. 8, the printing process of this embodiment will be described. In S301, the CPU 11 obtains label length information indicating the label length from the print setting. For example, the CPU 11 may obtain the label length information based on the image data representing the selected template image 72 and the type of the label sheet accommodated in the printer 2. In another example, in a case where the label length information is set by a user's operation for the print setting, the CPU 11 may obtain the set label length information. The print setting is, for example, displayed at the print setting area 82 in the editing screen 80.

In S302, the CPU 11 obtains model information of the printer 2. In S303, the CPU 11 obtains information of the maximum sheet length which is available in a single successive printing based on the obtained model information. The model information may be stored in the label creating application 42, or obtained from either the OS 41 or the printer 2. The information of the maximum sheet length based on the model information may be stored in the label creating application 42, or obtained from either the printer 2 or an external device (e.g., a server).

In S304, the CPU 11 sets an upper limit of the number of printing based on the label length information obtained at S301 and the information of the maximum sheet length obtained at S303. The CPU 11 sets acceptable upper limit of the number of printing such that the product of the label length and the upper limit of the number of printing is less than or equal to the maximum sheet length.

Figure 9:
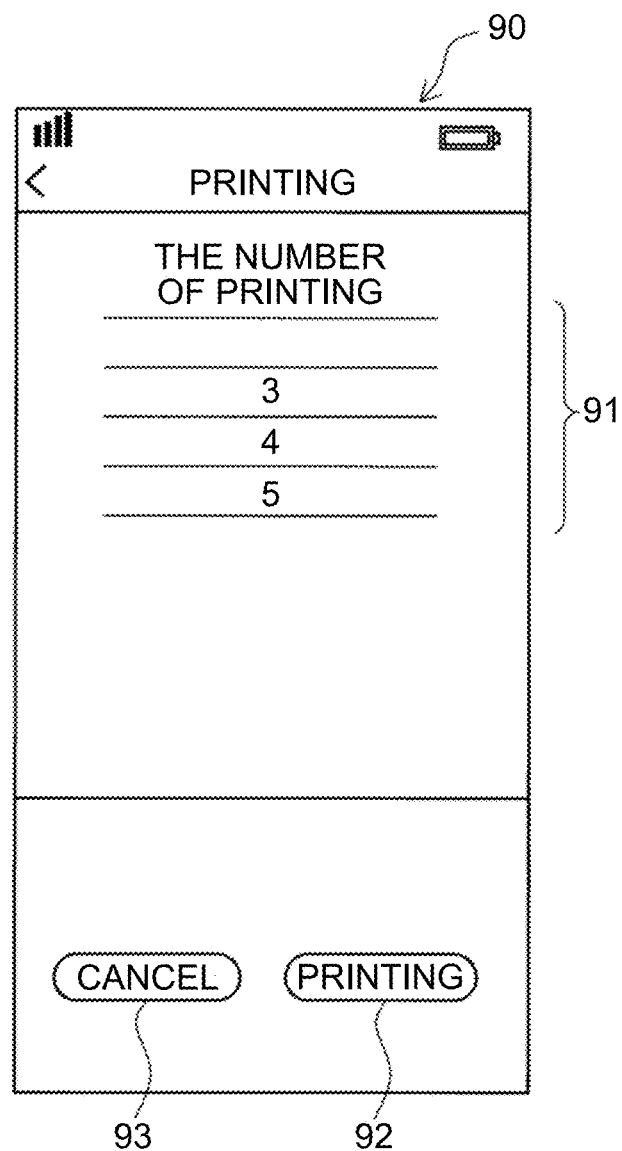
FIG. 9 is an illustrative figure indicating an example of a number selection screen.

In S305, the CPU 11 displays a number selection screen 90 on the user I/F 20. As described in FIG. 9, the number selection screen 90 includes, for example, number options 91, a print button 92, a cancel button 93. The number options 91 indicates options of the number of printing. The number options 91 may be displayed in a scroll format. The user selects one option from the number options 91. The number options 91 are within the range of 1 to the upper limit of the number of printing which has been set in S304.

The label creating application 42 causes the CPU 11 to transmit a single print job by which multiple number of printing may be executed to the printer 2. That is, the single print job transmitted to the printer 2 causes printing for the label sheet whose length is calculated by multiplying the label length by the number of printing. If the printer 2 receives a print job for the label sheet whose length is more than the maximum sheet length which is set at the printer 2, the printer 2 may stop printing temporarily. By this temporal stop of printing, the user may feel an awkwardness. In this embodiment, the upper limit of the number of printing is set based on the label length. Therefore, setting of the number of printing by which the single successive printing is not capable of being executed may be avoided.

In S306, the CPU 11 determines whether the print instruction is received by user's operation to the print button 92. In S307, in a case where it is determined that the print instruction is not received (NO in S306), the CPU 11 determines whether the cancel instruction is received by user's operation to the cancel button 93. In a case where it is determined that the cancel instruction is not received (NO in S307), the CPU 11 waits to proceed until either the print instruction or the cancel instruction is received.

In S308, in a case where it is determined that the print instruction is received (YES in S306), the CPU 11 obtains information of the number of printing which is set from the number options 91. In S309, the CPU 11 creates a print job. In S310, the CPU 11 transmits the created print job to the printer 2. The print job transmitted to the printer 2 is an example of a "print instruction". After S310 or in a case where it is determined that the cancel instruction is received (YES in S307), the CPU 11 terminates the printing process, and goes back to the editing process of FIG. 5.

Figure 2:
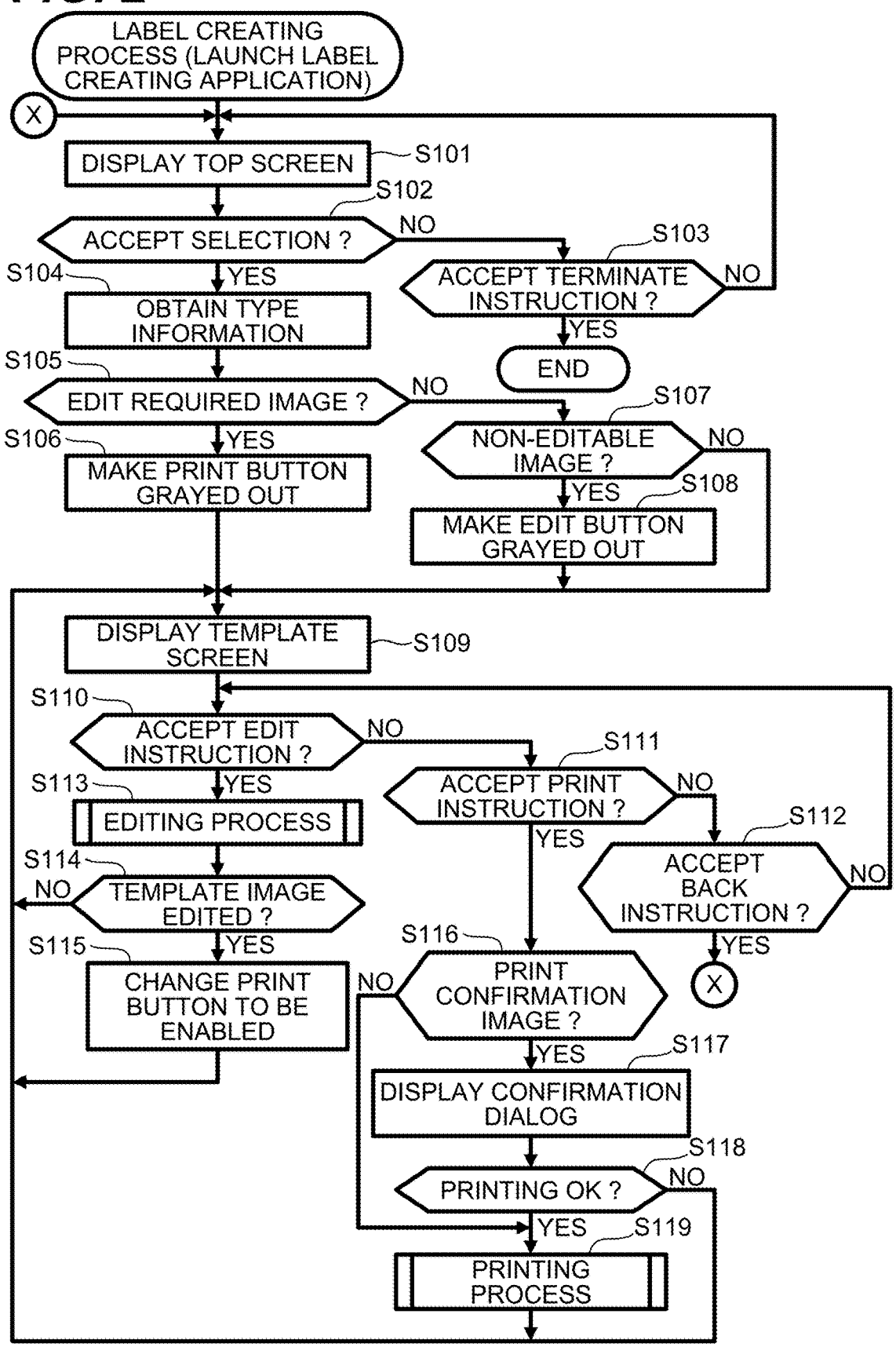
FIG. 2 is a flowchart of a label creating process.
Figure 5:
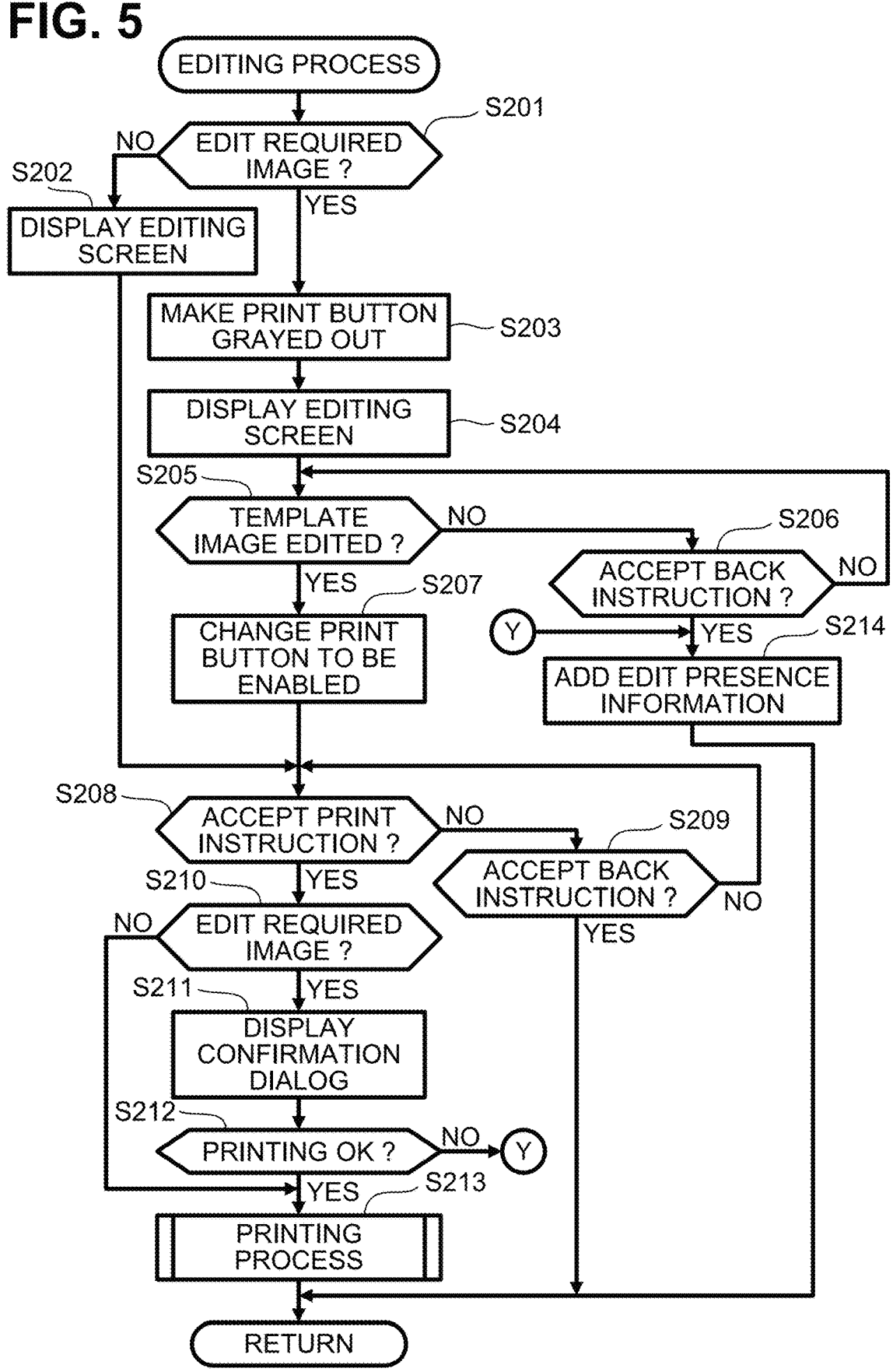
FIG. 5 is a flowchart of an editing process.

At the editing process in FIG. 5, after the printing process of S213 or in a case where it is determined that the back instruction is received (YES in S206, YES in S209), the CPU 11 terminates the editing process, and goes back to the label creating process of FIG. 2.

In response to going back to the label creating process from the editing process, the CPU 11 obtains edit presence information as a return value. The edit presence information indicates whether the template image has been edited in the editing process. In a case where it is determined that the back instruction is received (YES in S206) or where it is determined that the user's input operation for canceling to instruct printing is received at the confirmation dialog (NO in S212), the CPU 11 creates the edit presence information indicating that the template image is not edited or the template image is incompletely edited. Nevertheless, in other embodiments, in a case where it is determined that the user's input operation for canceling to instruct printing is received at the confirmation dialog (NO in S212), the CPU 11 may terminate to display the confirmation dialog, and may display the editing screen 80.

On the other hand, after the printing process of S213 is executed or in a case where it is determined that the back instruction is received (YES in S209), the CPU 11 does not create the edit presence information. Nevertheless, in other embodiments, the CPU 11 may create the edit presence information regardless of whether the template image has been edited. Nevertheless, in other embodiments, the edit presence information may create only if the template image has been edited, and indicate that the template image has been edited. That is, in other embodiments, the CPU 11 may create the edit presence information indicating that the template image has been edited after the printing process of S213 is executed or in a case where it is determined that the back instruction is received (YES in S209), and may not create the edit presence information in a case where it is determined that the back instruction is received (YES in S206) or where it is determined that the user's input operation for canceling to instruct printing is received at the confirmation dialog (NO in S212).

In S114 of FIG. 2, the CPU 11 determines whether the template image has been edited based on the edit presence information which is the return value of S113. In S115, in a case where it is determined that the template image has been edited (YES in S114), the CPU 11 changes the print button 74 (refer to FIG. 6) to be enabled.

After the print button is changed to be enabled (S115) or in a case where it is determined that the template image has not been edited (NO in S114), the CPU 11 waits to proceed until either the edit instruction, the print instruction or the back instruction is received while displaying the template screen 70. In a case where the type of the template image is the edit required image, the print button 74 in the template screen 70 is changed to be enabled after the template image has been edited. Therefore, the print instruction may be received. On the other hand, in a case where it is determined that the template image has not been edited at the editing process, the CPU 11 does not change the print button 74 from being disabled to being enabled, and displays the template screen 70 which is the same as the previous template screen 70.

In a case where it is determined that the print instruction is received at the template screen 70 (YES in S111), in S116, the CPU 11 determines whether the type of the selected template image 72 is the print confirmation image. In a case where it is determined that the type of the selected template image is the print confirmation image (YES in S116), in S117, the CPU 11 displays a confirmation dialog on the user I/F 20, and waits for receiving a user's input operation. The input operation received at S117 is an example of a "second permission instruction".

As described at FIG. 4D, the print confirmation image is preferable to being edited. It may be supposed that the user forgets to edit the template image whose type is the print confirmation image. Considering such a case, in this embodiment, the CPU 11 display the confirmation dialog for confirming whether printing is permitted, and waits for receiving the user's input operation. According to the confirmation before printing, unnecessary printing may be avoided.

In S118, the CPU 11 determines whether a user's input operation for instructing printing is received at the confirmation dialog. In a case where it is determined that the type of the template image is not the print confirmation image (NO in S116) or that the user's input operation for instructing printing is received (YES in S118), in S119, the CPU 11 executes a printing process. The printing process is a process for printing the selected template image, and is the same as the printing process of FIG. 8 executed at the step of S213 (FIG. 5).

Nevertheless, in other embodiments, in a case where it is determined that the template image whose type is the edit required image has been edited and where the print instruction is received by using the enabled print button 74, the confirmation dialog may be displayed. According to the confirmation before printing, the printing of the template image whose type is the edit required image which has been incompletely edited may be avoided.

After the printing process (S119) or in a case where it is determined that the user's input operation for canceling to instruct printing is received (NO in S118), the CPU 11 waits to proceed until either the edit instruction, the print instruction or the back instruction is received while displaying the template screen 70.

In a case where it is determined that the back instruction is received at the template screen 70 (YES in S112), the CPU 11 goes back to S101, and displays the top screen 50. At the top screen 50, the CPU 11 waits for receiving selection of the example image or the terminative instruction. Thus, description of the label creating process is completed.

As described in detail, according to the label creating application 42 of this embodiment, the device 1 receives the selection of the template image, and displays the template screen 70 including the selected template image. In a case where the type of the selected template image is the edit required image and where the selected template image is not edited, the print button 74 in the template screen 70 is grayed out and is disabled. On the other hand, in a case where the type of the selected template image is not the edit required image, or in a case where the type of the selected template image is the edit required image and the selected template image has been edited, the print button 74 in the template screen 70 is enabled. Thus, a print instruction for the template image whose type is the edit required image is not received before the template image is edited. Therefore, waste of the print medium by printing the unedited template image whose type is the edit required image may be avoided.

Hereinafter, a second embodiment relating to a program implemented in the device will be described in detail with reference to the drawings. The second embodiment is different from the first embodiment in the procedure of the editing process. The configurations and processes which are the same as those of the first embodiment are designated by the same reference numeral and the description will be omitted.

Figure 10:
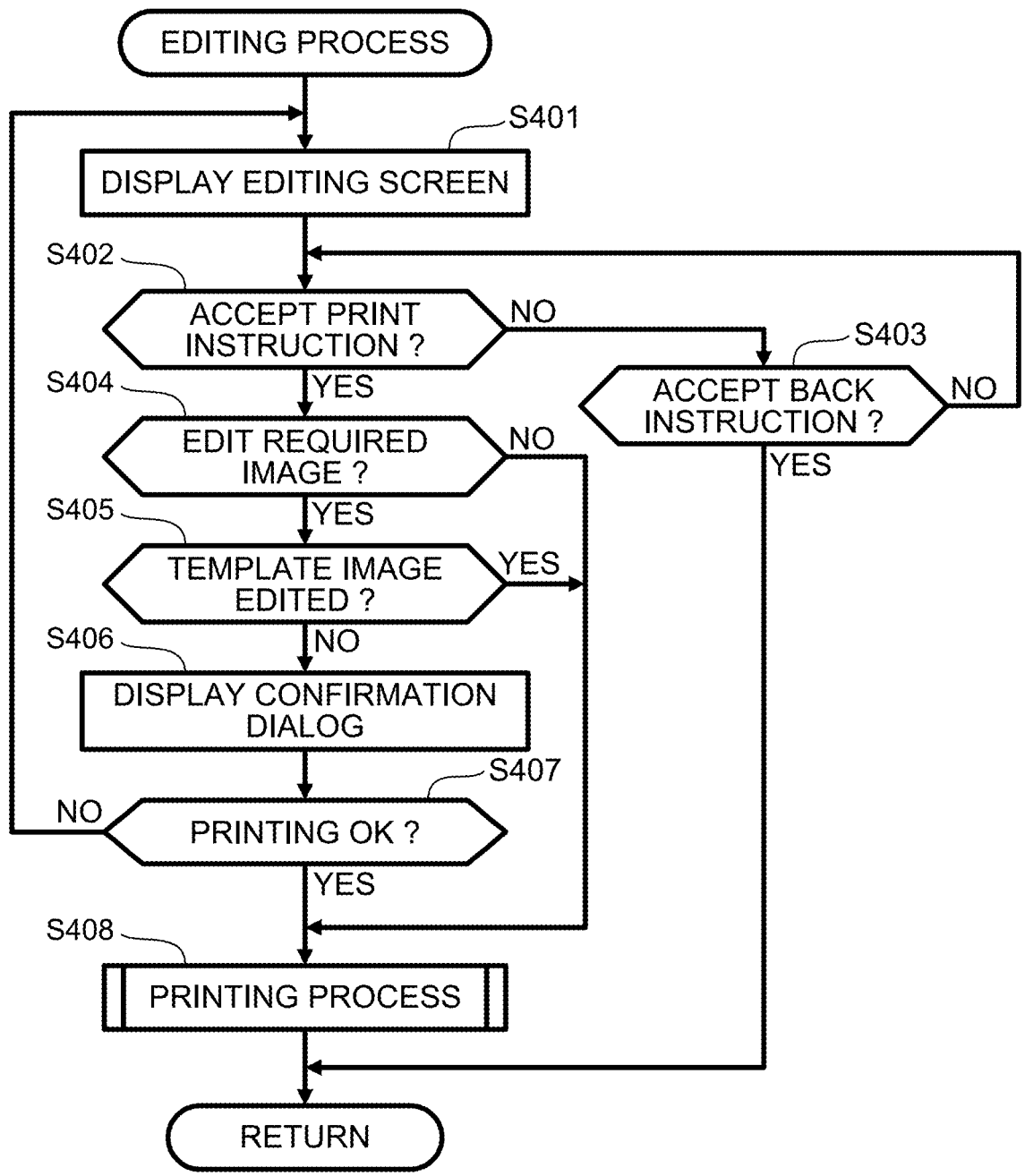
FIG. 10 is a flowchart of an editing process.

Hereinafter, referring to the flowchart of FIG. 10, the editing process of this embodiment will be described. The label creating process is executed at S113 of the label creating process (FIG. 2), which is the same or similar to that of the first embodiment.

In the editing process of this embodiment, in S401, the CPU 11 displays an editing screen 80 (refer to FIG. 7) on the user I/F 20. In this embodiment, the CPU 11 displays the editing screen 80 including an enabled print button 83 regardless of the type of the selected template image. The editing screen 80 is an example of the "second screen", and the print button 83 is an example of the "third object". In this embodiment, in response to proceeding to S401, the selected template image is treated as having been edited, and the editing screen 80 including the enabled print button 83 is displayed even if the type of selected template image is the edit required image.

In S402, the CPU 11 determines whether the print instruction is received. In S403, in a case where it is determined that the print instruction is not received (NO in S402), the CPU 11 determines whether the back instruction is received. In a case where it is determined that the back instruction is not received (NO in S403), the CPU 11 waits to proceed until either the print instruction or the back instruction is received.

Until the print instruction or the back instruction is received, the CPU 11 receives the edit instruction for the editing area 81, and updates the display of the editing area 81 based on the edit instruction.

In S404, in a case where it is determined that the print instruction is received (YES in S402), the CPU 11 determines whether the type of the template image which is displayed at the editing area 81 is the edit required image. In S405, in a case where it is determined that the type of the template image is the edit required image (YES in S404), the CPU 11 determines whether the template image has been edited. The determination of S405 is, for example, similar to the determination of S205 (FIG. 5) in the editing process of the first embodiment.

In S406, in a case where it is determined that the template image has not been edited (NO in S405), the CPU 11 displays a confirmation dialog on the user OF 20, and waits for receiving a user's input operation. The input operation received at S406 is an example of a "first permission instruction". In S407, the CPU 11 determines whether the print instruction is received. For example, the CPU 11 displays the confirmation dialog including a message and a confirmation. The message is for notifying the user that the type of the template image is the edit required image and the template image has not been edited. The confirmation is for confirming whether printing of the template image without editing is permitted. Then, the CPU 11 waits for receiving the user's input operation. According to the confirmation before printing in a case where a user's input operation for printing unedited template image whose type is the edit required image, an accidental operation for instructing printing for the unedited template image may be avoided.

In a case where it is determined that the user's input operation for instructing printing is not received (NO in S407), the CPU 11 waits to proceed until either instruction is received while displaying the editing screen 80. On the other hand, in a case where it is determined that the type of the template image is not the edit required image (NO in S404) or that the user's input operation is received (YES in S407), in S408, the CPU 11 executes a printing process. The printing process of S408 is similar to the printing process of S213 (FIG. 5) in the first embodiment, and is described in FIG. 8.

After the printing process is executed or in a case where it is determined that the back instruction is received (YES in S403), the CPU 11 terminates the editing process, and goes back to the label creating process of FIG. 2.

As described above, in S114 of FIG. 2, the CPU 11 determines whether the template image has been edited based on the edit presence information which is the return value of the editing process. In the editing process of this embodiment, the edit presence information as the return value is not created. Therefore, the CPU 11 determines that the template image has been edited in S114, and changes the print button 74 (refer to FIG. 6) to be enabled in S115.

That is, in this embodiment, the CPU 11 treats that the template image has been edited in a case where the editing process (FIG. 5) has been executed. By this configuration, the unedited template image whose type is the edit required image may be treated as having been edited. Considering this possibility, in other embodiments, the CPU may determine whether the type of the template image is the edit required image in S116 in response to receiving the print instruction (YES in S111), and may display the confirmation dialog in S117 even in a case where it is determined that the type of template image is the edit required image.

As described in detail, according to the label creating application 42 of the second embodiment, the device 1 displays the template screen 70 including the print button 74 being grayed out (that is, the print button 74 being disabled) in a case where the type of the selected template image is the edit required image and where the selected template image is not edited. Therefore, waste of the print medium may be avoided.

While each of the embodiments is merely an example and does not limit the scope of the invention. Therefore, various changes, arrangements and modifications may be applied in the present invention unless departing from the scope of the present invention. For example, the device 1 may not necessarily be portable, and may be a stationary computer (e.g., a personal computer). The number of printers connected to the device 1 may not be limited to one, and may be a plural. The printing method of printer 2 is not limited to the thermal transfer type, and may be, for example, a thermal type, an inkjet print type or a laser print type. The print medium used in the printer 2 is not limited to the label sheet, and may be a cut sheet or a roll sheet.

The shape of each button and image in each figure are not limited to the example in each figure described above. The style in the top screen 50 is not limited to the list of the example images described in FIG. 3, and may be a list of the template images or a list of the name of the template images.

The label creating application 42 in each embodiment causes the CPU 11 to create the print job and transmit the created print job, but the processes of the label creating application 42 is not limited to these processes. For example, the label creating application 42 may cause the CPU 11 to transmit image data to be printed and print setting information to another program, and the other program may create the print job and transmit the created print job to the printer 2.

In any flowcharts disclosed in each embodiment, the sequence of processes in any steps may be changed and the processes may be executed in parallel unless no conflict occurs in the content of the processes.

The processes disclosed in the specification may be implemented by single CPU, multiple CPUs, hardware (e.g., ASIC) or a combination thereof. The processes disclosed in the specification may be implemented by various approaches, for example, control methods and computer programs for implementing functions of devices or the above-described methods, or computer-readable storage media storing the computer program

What is claimed is:

1. A non-transitory computer-readable recording medium storing instructions, wherein the instructions, when executed by a controller of a device having a function for displaying a template image, cause the device to perform:

selecting a template image, the template image being one of a plurality of types of template images including a first type of template image required to be edited and a second type of template image different from the first type of template image;

displaying a first screen on a display of the device, the first screen including the selected template image and a first object, the first object being used for receiving a print instruction;

making the first object in the first screen disabled in a case where the selected template image is the first type of template image and has not been edited, wherein the first object is not made disabled in a case where the selected template image is the second type of template image;

receiving an edit instruction for editing the selected template image;

making the first object in the first screen enabled in a case where the selected template image is the first type of template image and has been edited; and outputting a print job for printing the selected template image in a case where the first object in the first screen is operated via an input interface of the device.

2. The non-transitory computer-readable recording medium according to claim 1, wherein the first screen includes a second object used for receiving the edit instruction.

3. The non-transitory computer-readable recording medium according to claim 2, wherein the plurality of types of template images includes a third type of template image which is incapable of being edited, and the instructions further cause the device to perform:
making the second object in the first screen disabled in a case where the selected template image is the third type of template image; and
making the second object in the first screen enabled in a case where the selected template image is either the first type of template image or the second type of template image.

4. The non-transitory computer-readable recording medium according to claim 1, wherein the instructions further cause the device to perform:
displaying a second screen on a display of the device, the second screen being for editing the selected template image, the second screen including a third object used for receiving the print instruction;
making the third object in the second screen disabled in a case where the selected template image is the first type of template image and has not been edited;
making the third object in the second screen enabled in a case where the selected template image is the first type of template image and has been edited;
making the third object in the second screen enabled in a case where the selected template image is the second type of template image; and
outputting the print job for printing the selected template image in a case where the third object in the second screen is operated via the input interface of the device.

5. The non-transitory computer-readable recording medium according to claim 1, wherein the instructions further cause the device to perform:
displaying a second screen on a display of the device, the second screen being for editing the selected template image, the second screen including a third object, the third object being enabled and used for receiving the print instruction; and
outputting the print job for printing the selected template image in a case where the third object in the second screen is operated via the input interface of the device.

6. The non-transitory computer-readable recording medium according to claim 5, wherein the instructions further cause the device to perform:
in a case where the selected template image is the first type of template image, determining whether the selected first type of template image has been edited, the determination being executed after the third object is operated and before the print job is outputted;
outputting a first confirmation information for confirming whether the print job is permitted to be outputted in a case where the selected first type of template image has not been edited;
outputting the print job for printing the selected first type of template image in a case where a first permission instruction indicating permission of outputting the print job is received, wherein the print job is not outputted in a case where the first permission instruction is not received; and
outputting the print job for printing the selected first type of template image without outputting the first confirmation information in a case where the selected first type of template image has been edited.

7. The non-transitory computer-readable recording medium according to claim 1, wherein the second type of template image includes a specific type of template image, the specific type of template image requiring confirmation of whether the print job is to be outputted before the print job is outputted, and the instructions further cause the device to perform:
outputting a second confirmation information for confirming whether the print job is permitted to be outputted in a case where the first object in the first screen is operated via an input interface of the device and where the selected template image is the specific type of template image; and
outputting the print job for printing the selected specific type of template image in a case where a second permission instruction indicating permission of outputting the print job is received, wherein the print job is not outputted in a case where the second permission instruction is not received.

8. The non-transitory computer-readable recording medium according to claim 1, wherein the non-transitory computer-readable recording medium stores template image data and attribute information in association with each other, the template image data represents the template image, the attribute information represents a type of the corresponding template image, and the instructions further cause the device to perform:
determining the type of the selected template image by using the attribute information corresponding to the selected template image.

9. The non-transitory computer-readable recording medium according to claim 1, wherein the instructions further cause the device to perform:
specifying an object type of the template image; and
determining the type of the selected template image based on the specified object type.

10. The non-transitory computer-readable recording medium according to claim 1, wherein the device is configured to connect with a label printer,
the label printer is configured to print an image on a label sheet by conveying the label sheet in a conveying direction, and the instructions further cause the device to perform:
acquiring size information representing an image length in a direction corresponding to the conveying direction;
acquiring label length information representing a label length of the label sheet in the conveying direction capable of being used in a single printing; and
setting an upper limit of the number of printing based on the size information and the label length information.

11. A device comprising:
an input interface; and
a controller configured to perform:
- selecting a template image, the template image being one of a plurality of types of template images including a first type of template image required to be edited and a second type of template image different from the first type of template image;
- displaying a first screen on a display of the device, the first screen including the selected template image and a first object, the first object being used for receiving print instruction;
- making the first object in the first screen disabled in a case where the selected template image is the first type of template image and has not been edited, wherein the first object is not made disabled in a case where the selected template image is the second type of template image;
- receiving an edit instruction for editing the selected template image;
- making the first object in the first screen enabled in a case where the selected template image is the first type of template image and has been edited; and
- outputting a print job for printing the selected template image in a case where the first object in the first screen is operated via the input interface.

12. A non-transitory computer-readable recording medium storing instructions, wherein the instructions, when executed by a controller of a device having a function for displaying a template image, cause the device to perform:
- receiving a selection instruction in response to a user input for selecting one of a first template image and a second template image, wherein the first template image is associated with first attribute information, and the second template image is associated with second attribute information;
- determining whether the selection instruction indicates that the first template image is selected or the second template image is selected;
- in a case where it is determined that the user input indicates that the first template image is selected:
  - displaying a first screen on the display, the first screen including the first template image and a first object, wherein the first object is disabled according to the first attribute information;
  - determining whether the first template image has been edited; and
  - in a case where it is determined that the first template image has been edited, enabling the first object; and
- in a case where it is determined that the user input indicates that the second template image is selected:
  - displaying the first screen on the display, the first screen including the second template image and the first object, wherein the first object is enabled according to the second attribute information.

13. The non-transitory computer-readable recording medium according to claim 12, wherein the instructions further cause the device to perform:
- in a case where it is determined that the user input indicates that the first template image is selected:
  - displaying the first screen on the display, the first screen including the first template image, the first object, and a second object, wherein the first object is disabled and the second object is enabled according to the first attribute information;
  - receiving an edit instruction in response to a user input via the second object, wherein the edit instruction indicates editing the first template image;
  - displaying a second screen on the display in response to receiving the edit instruction, the second screen including the first template image and a third object;
  - determining whether the first template image has been edited; and
  - in a case where it is determined that the first template image has been edited, enabling the third object.

14. The non-transitory computer-readable recording medium according to claim 13, wherein the instructions further cause the device to perform:
- receiving the selection instruction in response to the user input for selecting one of the first template image, the second template image, and a third template image, wherein the third template image is associated with third attribute information;
- determining whether the selection instruction indicates that the third template image is selected; and
- in a case where it is determined that the user input indicates that the third template image is selected:
displaying the first screen on the display, the first screen including the third template image and the second object, wherein the second object is disabled according to the third attribute information.

* * * * *